(12) United States Patent
Kishimoto

(10) Patent No.: US 9,170,538 B2
(45) Date of Patent: Oct. 27, 2015

(54) ELECTRONIC DEVICE

(71) Applicant: KYOCERA Document Solutions Inc., Osaka (JP)

(72) Inventor: Mitsuyuki Kishimoto, Osaka (JP)

(73) Assignee: KYOCERA DOCUMENT SOLUTIONS INC., Osaka-Shi (JP)

( * ) Notice: Subject to any disclaimer, the term of this patent is extended or adjusted under 35 U.S.C. 154(b) by 337 days.

(21) Appl. No.: 13/660,204

(22) Filed: Oct. 25, 2012

(65) Prior Publication Data

US 2013/0106186 A1  May 2, 2013

(30) Foreign Application Priority Data

Oct. 28, 2011  (JP) ................................. 2011-236788

(51) Int. Cl.
*H02J 1/00* (2006.01)
*G03G 15/00* (2006.01)
*H02J 9/00* (2006.01)

(52) U.S. Cl.
CPC ............ *G03G 15/5004* (2013.01); *H02J 9/005* (2013.01); *G03G 15/80* (2013.01); *Y10T 307/406* (2015.04)

(58) Field of Classification Search
CPC ......... H02J 1/00; H02J 9/005; G03G 15/5004
USPC ....... 307/48; 327/544, 581; 323/267; 368/10; 455/424; 713/300; 700/22; 716/138
See application file for complete search history.

(56) References Cited

U.S. PATENT DOCUMENTS

| | | | | |
|---|---|---|---|---|
| 5,362,989 | A * | 11/1994 | Hennedy ........................ | 327/544 |
| 7,562,332 | B1 * | 7/2009 | Tuan et al. .................... | 716/138 |
| 7,593,291 | B2 * | 9/2009 | Ito .................................. | 368/10 |
| 8,296,586 | B2 * | 10/2012 | Watanabe et al. ............. | 713/300 |
| 2006/0197382 | A1 * | 9/2006 | Chou et al. ..................... | 307/48 |
| 2008/0072080 | A1 * | 3/2008 | Chapuis et al. ............... | 713/300 |
| 2008/0074091 | A1 * | 3/2008 | Petrowsky et al. ........... | 323/267 |
| 2009/0005885 | A1 * | 1/2009 | Qahouq et al. .................. | 700/22 |
| 2010/0291919 | A1 * | 11/2010 | Whittam et al. .............. | 455/424 |
| 2011/0057724 | A1 * | 3/2011 | Pabon ........................... | 327/581 |

FOREIGN PATENT DOCUMENTS

JP  2004-034520 A  2/2004

* cited by examiner

*Primary Examiner* — Rexford Barnie
*Assistant Examiner* — Thai Tran
(74) *Attorney, Agent, or Firm* — Knobbe Martens Olson & Bear LLP

(57) ABSTRACT

An electronic device includes a power supply, a current measuring unit, a converter, a plurality of devices, and a control unit. The current measuring unit measures a current value of current that is output from the power supply. The voltage and the current from the power supply are input into the converter, and the converter converts the input voltage into voltage of a different voltage value, and outputs the voltage thus converted and the current. The control unit controls the converter to output voltage of a voltage value corresponding to a minimum current value measured by the current measuring unit, in which the voltage is voltage of a voltage value between a maximum value of lower limit voltage and a minimum value of upper limit voltage within an operating voltage range of one or a plurality of devices that operate in the energy saving mode.

4 Claims, 6 Drawing Sheets

| DEVICE | OPERATING VOLTAGE RANGE [V] |
|---|---|
| 1 | 1.5～2.1 |
| 2 | 1.6～2.0 |
| 3 | 1.7～1.9 |
| 4 | 1.5～1.9 |

FIG. 5

| ENERGY SAVING MODE | CONTROL BY POWER SHUTDOWN UNIT | | | |
|---|---|---|---|---|
| | DEVICE 1 | DEVICE 2 | DEVICE 3 | DEVICE 4 |
| 1 | ON | OFF | OFF | OFF |
| 2 | ON | ON | OFF | OFF |
| 3 | ON | ON | ON | OFF |

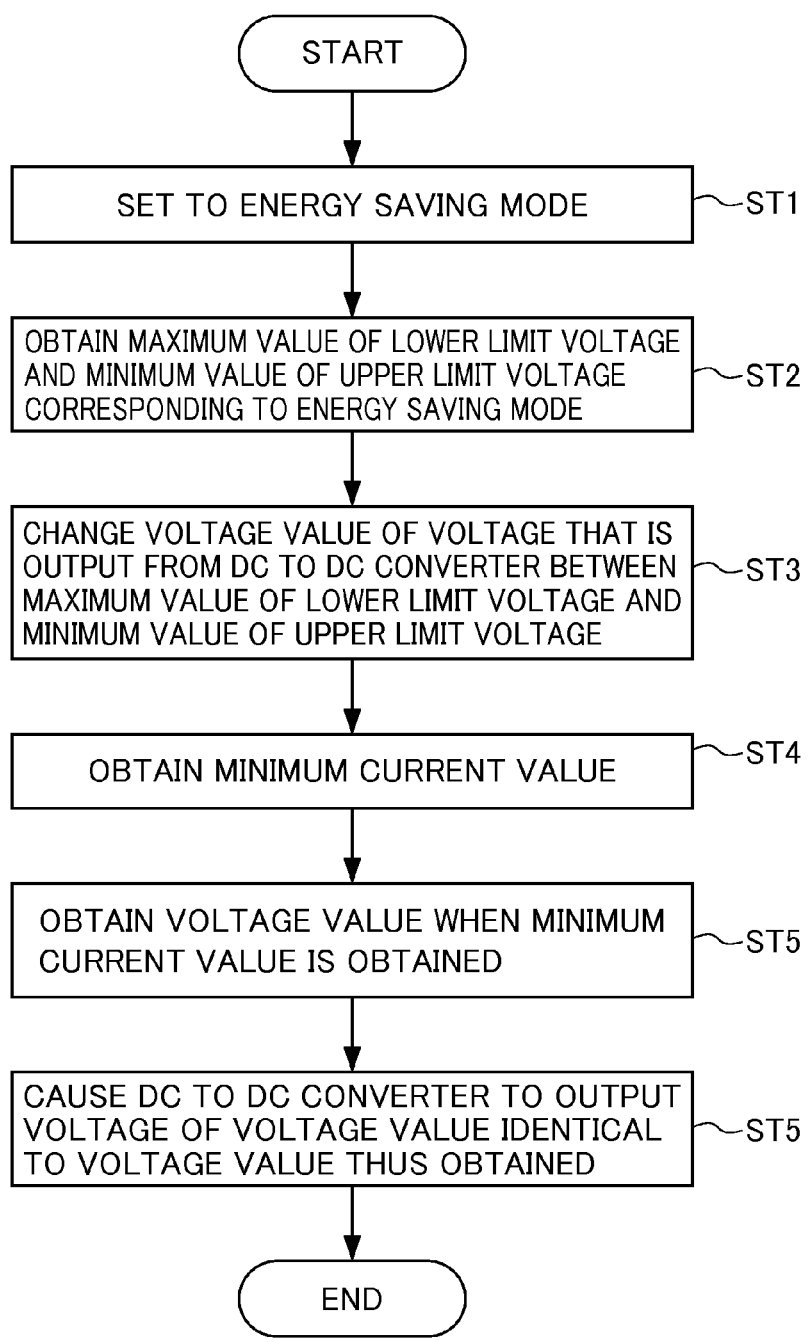

ELECTRONIC DEVICE

INCORPORATION BY REFERENCE

This application is based upon and claims the benefit of priority from the corresponding Japanese Patent Application No. 2011-236788, filed in the Japan Patent Office on Oct. 28, 2011, the entire contents of which are incorporated herein by reference.

BACKGROUND

The present disclosure relates to an electronic device that is capable of setting an energy saving mode for reducing power consumption.

Some types of electronic devices such as a multifunction peripheral and a printer (an image forming apparatus) convert AC voltage into DC voltage, and subsequently convert the DC voltage, which is input to a DC to DC converter, into DC voltage of a different voltage value to be output to each unit (each function). Furthermore, in a case in which a normal mode for operating normal operations to form an image on a paper sheet is switched over to an energy saving mode for reducing power consumption, some types of electronic devices set an output of a DC to DC converter to a lower limit of operating voltage (a power supply specification) of each unit (each function) that operates in the energy saving mode.

However, with the electronic devices as described above, in a case in which the output of the DC to DC converter is set to the lower limit of the operating voltage of each unit (each function), voltage difference between input voltage and output voltage of the DC to DC converter may be increased, resulting in deterioration of the efficiency of the DC to DC converter. In addition, the deterioration of the efficiency of the DC to DC converter adversely increases the power consumption of the electronic device.

SUMMARY

The present disclosure relates to an electronic device that includes a power supply, a current measuring unit, a converter, a plurality of devices, and a control unit. The power supply outputs voltage and current. The current measuring unit measures a current value of current that is output from the power supply. The voltage and the current from the power supply are input into the converter, and the converter converts the input voltage into voltage of a different voltage value, and outputs the voltage thus converted and the current. Each of the plurality of devices operates by the voltage and the current that are output from the converter. In a case in which an energy saving mode is set for reducing power consumption, the control unit controls the converter to output voltage of a voltage value corresponding to a minimum current value measured by the current measuring unit, in which the voltage is voltage of a voltage value between a maximum value of lower limit voltage and a minimum value of upper limit voltage within an operating voltage range of one or a plurality of devices that operate in the energy saving mode.

BRIEF DESCRIPTION OF THE DRAWINGS

FIG. 1 is a diagram for illustrating an overall configuration of a multifunction peripheral according to an embodiment of the electronic device of the present disclosure;

FIG. 4 is a table showing an example of an operating voltage range of each device;

FIG. 5 is a table showing an example of devices that operate or do not operate in energy saving modes 1 to 3; and FIG. 6 is a flowchart for illustrating an example of operations of the multifunction peripheral.

DETAILED DESCRIPTION

Figure 1:
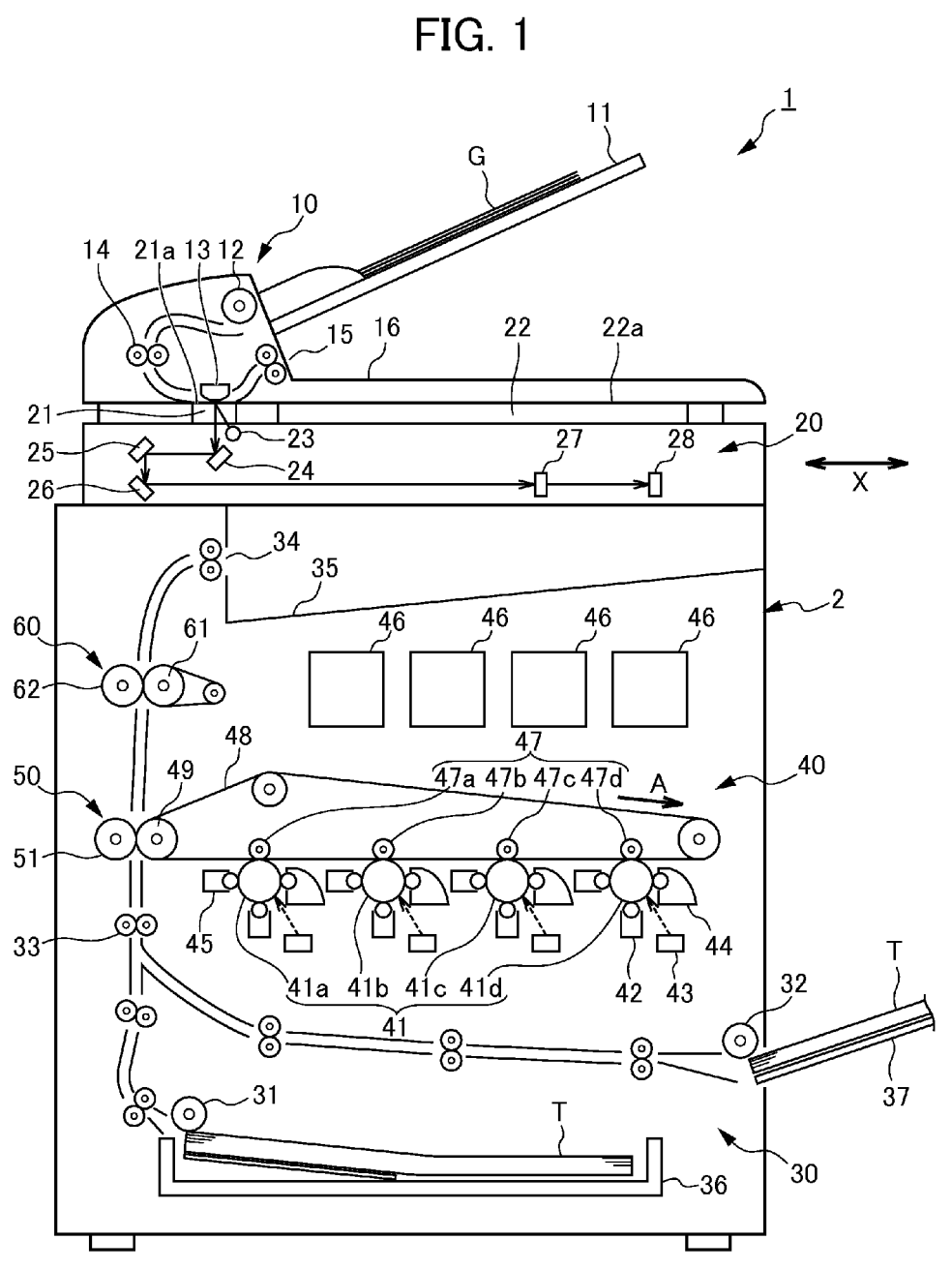
Figure 2:
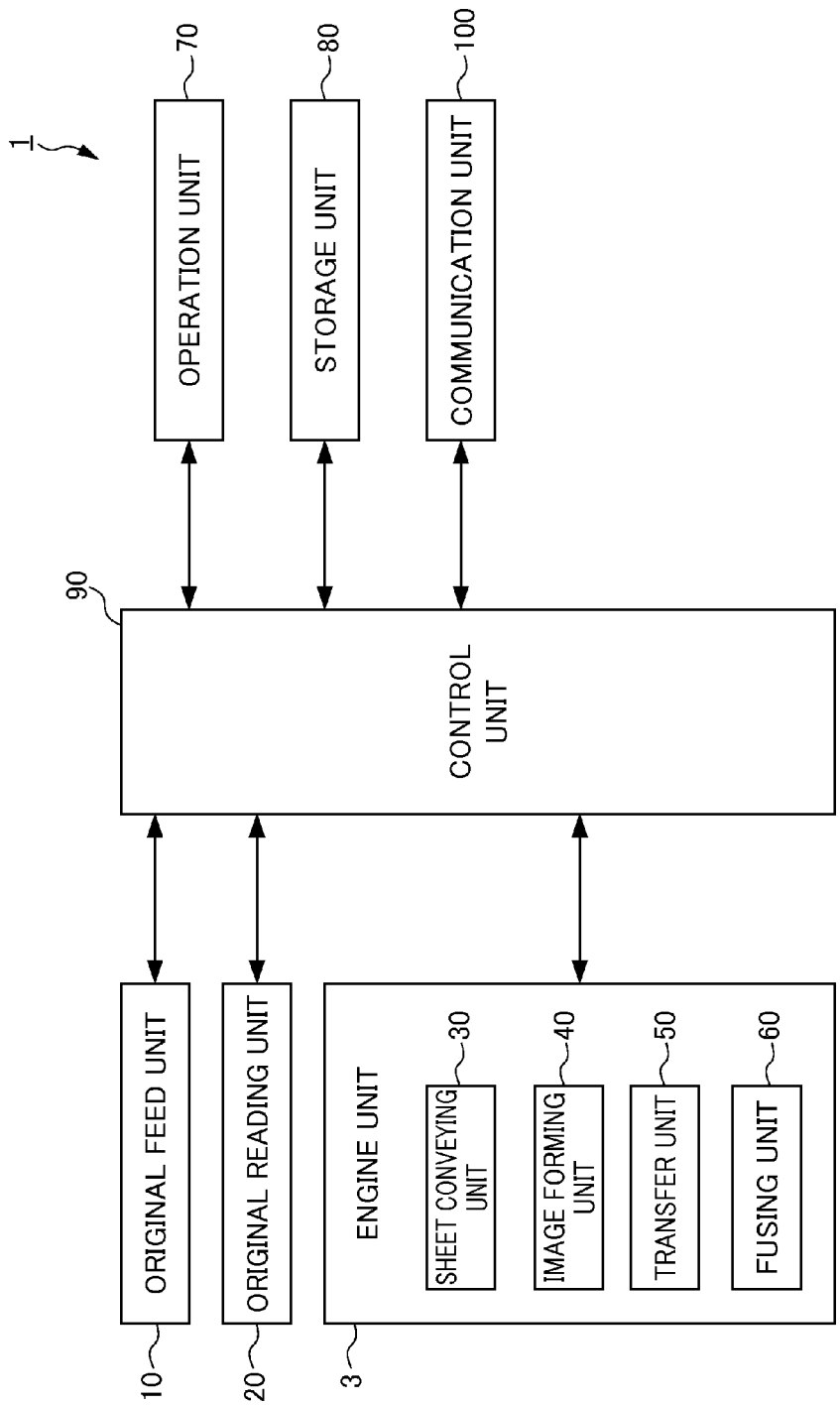
FIG. 2 is a block diagram showing a functional configuration of the multifunction peripheral.

An embodiment of the electronic device of the present disclosure is hereinafter described with reference to the drawings. The electronic device includes, for example, an image forming apparatus such as a multifunction peripheral, a copying machine, and a printer. Therefore, the following embodiment is described for a case in which the electronic device of the present disclosure is applied to a multifunction peripheral. Firstly, descriptions are provided for an overall configuration of a multifunction peripheral 1. FIG. 1 is a diagram for illustrating the overall configuration of the multifunction peripheral 1 according to the embodiment of the electronic device of the present disclosure.

As shown in FIG. 1, the multifunction peripheral 1 of the present embodiment includes an original conveying unit 10, the original reading unit 20, a sheet conveying unit 30, an image forming unit 40, a transfer unit 50, and a fixing unit 60.

The original conveying unit 10 is composed of an automatic document feeder (ADF), and includes an original mounting unit 11, a first feed roller 12, a guide 13, a timing roller pair 14, and an original discharge unit 15. The first feed roller 12 sequentially supplies an original G mounted on the original mounting unit 11 to the timing roller pair 14, on a sheet by sheet basis. The timing roller pair 14 conveys the original G or stops the conveyance of the original G, such that the timing of reading an image of the original G by the original reading unit 20 coincides with the timing of supplying the original G to the position for reading the image of the original G by the original reading unit 20 (a position in which the guide 13 is disposed). The guide 13 introduces the original G thus conveyed to a first reading surface 21a (to be described below). The original discharge unit 15 discharges an original G of which image is read by the original reading unit 20 (passed through the guide 13) to the outside of a multifunction peripheral main body 2.

In the original discharge unit 15, an original accumulation unit 16 is formed on an outer side of the multifunction peripheral main body 2. An original G discharged from the original discharge unit 15 is stacked and collected in the original accumulation unit 16.

The original reading unit 20 includes the first reading surface 21a and a second reading surface 22a. The first reading surface 21a is formed along the upper surface of a first contact glass 21 disposed to face the guide 13, and serves as a reading surface for reading an image of the original G. The second reading surface 22a is disposed adjacently to the first reading surface 21a (as shown in FIG. 1, along the majority of the right side of the first reading surface 21a). The second reading surface 22a is used for reading an image of the original G without using the original conveying unit 10. The second reading surface 22a is formed along the upper surface of a second contact glass 22 mounting the original G, and serves as a reading surface for reading an image of the original G.

The original reading unit 20 includes an illumination unit 23, a first mirror 24, a second mirror 25, a third mirror 26, an imaging lens 27, and an image capture unit 28, all of which are provided inside the multifunction peripheral main body 2.

Each of the illumination unit 23 and the first mirror 24 moves in a sub-scanning direction X. The second mirror 25 and the third mirror 26 are disposed on the left side of the illumination unit 23 and the first mirror 24 in FIG. 1. Furthermore, each of the second mirror 25 and the third mirror 26 moves in the sub-scanning direction X while maintaining a fixed distance (an optical path length) from the first reading surface 21a or the second reading surface 22a to the image capture unit 28, the optical path passing through the first mirror 24, the second mirror 25, the third mirror 26, and the imaging lens 27.

The illumination unit 23 is a light source that illuminates light onto the original G. The first mirror 24, the second mirror 25, and the third mirror 26 are mirrors that maintain a fixed optical path length while introducing light reflected by the original G to the imaging lens 27. When light is incident from the third mirror 26, the imaging lens 27 images the light onto the image capture unit 28. The image capture unit 28 is an image sensor for obtaining image data based on a focused light image, by converting the incident light into an electrical signal. The image capture unit 28 is, for example, a charge coupled device (CCD) or complementary metal oxide semiconductor (CMOS).

The sheet conveying unit 30 includes a second feed roller 31, a third feed roller 32, a registration roller pair 33, and a sheet discharge unit 34. The second feed roller 31 supplies a paper sheet T (a transfer medium) contained in the sheet cassette 36 to the transfer unit 50. The third feed roller 32 supplies a paper sheet T (a transfer medium) mounted on a manual feed tray 37 to the transfer unit 50. The registration roller pair 33 conveys the paper sheet T or stops the conveyance of the paper sheet T, such that the timing when a toner image arrives at the transfer unit 50 coincides with the timing when the paper sheet T is supplied to the transfer unit 50. The registration roller pair 33 corrects skew (inclination of the supplied paper) of the paper sheet T. The sheet discharge unit 34 discharges the paper sheet T with a toner image being fixed thereon to the outside of the multifunction peripheral main body 2.

A discharged-sheet accumulation unit 35 is formed on an outer side of the multifunction peripheral main body 2 in the sheet discharge unit 34. The paper sheet T discharged from the sheet discharge unit 34 is stacked and collected in the discharged-sheet accumulation unit 35.

The image forming unit 40 is intended for forming a toner image, and includes a photosensitive drum 41, a charging member 42, a laser scanning unit 43, a developing unit 44, a cleaning unit 45, a toner cartridge 46, a primary transfer roller 47, an intermediate transfer belt 48, and a counter roller 49.

The photosensitive drums 41 (41a, 41b, 41c and 41d) function as photosensitive bodies or image supporting bodies to form toner images of black, cyan, magenta and yellow, respectively. The charging member 42, the laser scanning unit 43, the developing unit 44 and the cleaning unit 45 are disposed in this order from upstream to downstream along the rotation direction of the photosensitive drums 41, around the periphery of each of the photosensitive drums 41a, 41b, 41c and 41d. The charging member 42 charges the surface of the photosensitive drum 41. The laser scanning unit 43 is disposed at a distance from the surface of the photosensitive drum 41, and the surface of the photosensitive drum 41 is scanned and exposed based on the image data regarding the original G that is read by the original reading unit 20. In this manner, a charge on the exposed portion is eliminated to form an electrostatic latent image on the surface of the photosensitive drum 41. The developing unit 44 form a toner image by attaching toners to the electrostatic latent image formed on the surface of the photosensitive drum 41. After the static charge is eliminated from the surface of the photosensitive drum 41 by a charge eliminator (not shown), the cleaning unit 45 removes residual toners and the like from the surface.

The toner cartridge 46 contains toners of respective colors supplied to the developing unit 44. The toner cartridge 46 and the developing unit 44 are connected with each other via a toner supply passage (not shown).

The primary transfer roller 47 (47a, 47b, 47c and 47d) is disposed opposite to the photosensitive drum (41a, 41b, 41c and 41d), with a part of the intermediate transfer belt 48 being sandwiched therebetween. The intermediate transfer belt 48 is a belt passing through the image forming unit 40 and the transfer unit 50. A part of the intermediate transfer belt 48 is sandwiched between the photosensitive drums 41a, 41b, 41c and 41d and the primary transfer rollers 47a, 47b, 47c and 47d, respectively, as a result of which the toner image formed on the surface of each of the photosensitive drums 41a, 41b, 41c and 41d is primarily transferred onto the intermediate transfer belt 48. The counter roller 49 is a drive roller disposed on an inner side of the annular intermediate transfer belt 48, and propels the intermediate transfer belt 48 in the direction of an arrow A shown in FIG. 1.

The transfer unit 50 includes a secondary transfer roller 51. The secondary transfer roller 51 is disposed opposite to the counter roller 49 interposing the intermediate transfer belt 48, such that a part of the intermediate transfer belt 48 is sandwiched between the secondary transfer roller 51 and the counter roller 49. The secondary transfer roller 51 secondarily transfers the toner image, which was primarily transferred onto the intermediate transfer belt 48, onto the paper sheet T.

The fixing unit 60 includes a heating rotational member 61 and a pressuring rotational member 62. The heating rotational member 61 and the pressuring rotational member 62 sandwich the paper sheet T, onto which the toner image was secondarily transferred, and melt and pressurize the toner to fix the toner on the paper sheet T.

Next, a functional configuration of the multifunction peripheral 1 is described. FIG. 2 is a block diagram showing a functional configuration of the multifunction peripheral 1.

The multifunction peripheral 1 includes the constituent elements as described above (i.e. the original conveying unit 10, the original reading unit 20, the sheet conveying unit 30, the image forming unit 40, the transfer unit 50, and the fixing unit 60). An engine unit 3 is configured by the sheet conveying unit 30, the image forming unit 40, the transfer unit 50, and the fixing unit 60. Description of those constituent elements that have been described with reference to FIG. 1 will be omitted.

In addition to the abovementioned functional configuration, the multifunction peripheral 1 further includes an operation unit 70, a storage unit 80, and a control unit 90.

The operation unit 70 includes a numeric keypad (not shown), a touch screen (not shown), and a start key (not shown). The numeric keypad is operated for input of numerals related to print copy number and the like. The touch screen displays a plurality of keys or the like that are assigned with various functions (for example, a function of setting a copy magnification, a function of allocating a plurality of pages to a single paper sheet T (2 in 1 or the like)). The keys displayed on the touch screen are operated for causing the multifunction peripheral 1 to execute any of the various functions. The start key is operated to execute printing. As a result of operating any of the keys, the operation unit 70 transmits a signal, which indicates that the key was operated, to the control unit 90.

The storage unit 80 is composed of a hard disk, a semiconductor memory, or the like. The storage unit 80 stores image data based on the original G read by the original reading unit 20. The storage unit 80 stores control programs used in the multifunction peripheral 1, and data used in relation to these control programs.

The communication unit 100 is connected to a communication line (not shown) or the like, and performs communication such as facsimile communication.

The control unit 90 controls the original conveying unit 10, the original reading unit 20, the engine unit 3, the operation unit 70, and the like.

Figure 3:
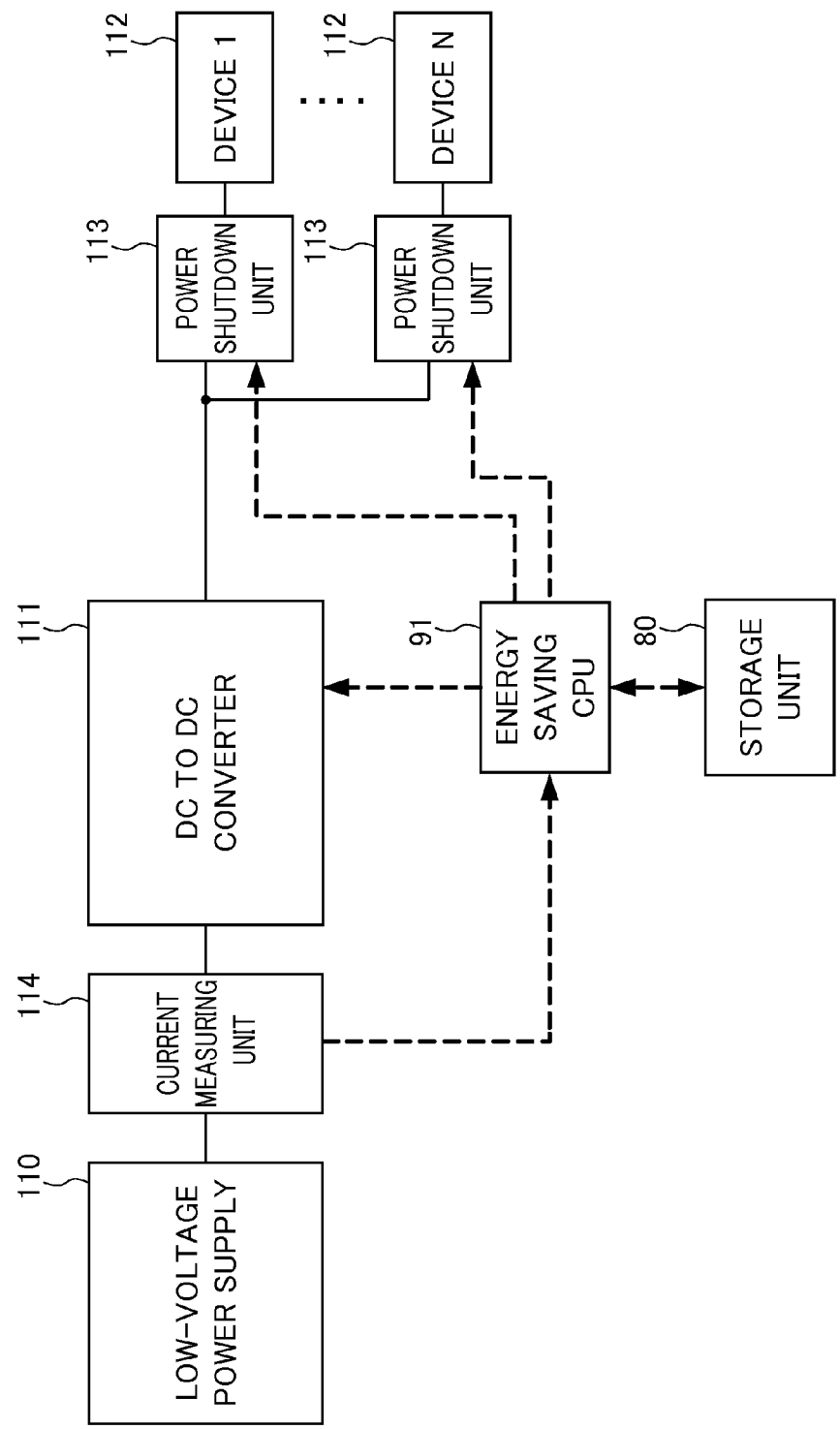
FIG. 3 is a block diagram for illustrating characteristic portions of the multifunction peripheral.

A configuration of characteristic portions of the multifunction peripheral 1 according to the present embodiment is hereinafter described with reference to the drawings. FIG. 3 is a block diagram for illustrating the characteristic portions of the multifunction peripheral 1. FIG. 4 is a table showing an example of an operating voltage range of each device 112 (circuits such as an ASIC (Application Specific Integrated Circuit) disposed in each device 112).

The multifunction peripheral 1 includes a low-voltage power supply 110, a current measuring unit 114, a DC to DC converter 111, a plurality of devices 112, a power shutdown unit 113, an energy saving CPU (Central Processing Unit) 91, and a storage unit 80. The low-voltage power supply 110 corresponds to an embodiment of "a power supply" of the present disclosure. The DC to DC converter 111 corresponds to an embodiment of "a converter" of the present disclosure. The power shutdown unit 113 corresponds to an embodiment of "a voltage-current shutdown unit" of the present disclosure. The energy saving CPU 91 corresponds to an embodiment of "a control unit" of the present disclosure.

The low-voltage power supply 110 outputs voltage and current.

The current measuring unit 114 is connected between the low-voltage power supply 110 and the DC to DC converter 111 to be described below. The current measuring unit 114 measures a current value of current that is output from the low-voltage power supply 110. The current measuring unit 114 outputs measurement data of the current value to the energy saving CPU 91 to be described below.

Voltage and current from the low-voltage power supply 110 are input into the DC to DC converter 111. The DC to DC converter 111 converts the input voltage into voltage of a different voltage value, and outputs the voltage thus converted and the current. In other words, the DC to DC converter 111 outputs DC voltage of a voltage value that is different from the voltage value of the input DC voltage. In accordance with control by the energy saving CPU 91 to be described below, the DC to DC converter 111 can change a voltage value of output DC voltage.

The devices 112 operate by voltage and current being output from the DC to DC converter. The devices 112 are, for example, the original reading unit 20, the engine unit 3, the communication unit 100, the operation unit 70, etc.

The power shutdown unit 113 is disposed upstream from each of the plurality of devices 112. In accordance with control by the energy saving CPU 91 to be described below, the power shutdown unit 113 can shut down the electric power (voltage and current) that is supplied from the DC to DC converter 111 to the devices 112. The power shutdown unit 113 is, for example, a switch, a bipolar transistor, a unipolar transistor, etc.

The energy saving CPU 91 configures a part of the control unit 90 described above. In a case in which an energy saving mode is set to the multifunction peripheral main body 2 to reduce power consumption, the energy saving CPU 91 controls the DC to DC converter 111 to output voltage of a voltage value corresponding to a minimum current value measured by the current measuring unit 114, the voltage being voltage of a voltage value between a maximum value of lower limit voltage and a minimum value of upper limit voltage within the operating voltage range of one or a plurality of devices 112 that operate in the energy saving mode.

For example, as shown in FIG. 4, in a case in which four of the devices 112 (device 1, device 2, device 3, and device 4) are operating in the energy saving mode, the lower limit voltage within the operating voltage range of the devices 112 (circuits disposed in the devices 112) is 1.5 V (for the device 1), 1.6 V (for the device 2), 1.7 V (for the device 3), and 1.5 V (for the device 4). The maximum value of the lower limit voltage is, for example, the voltage value of 1.7 V that is maximum among 1.5 V (for the device 1 and the device 4), 1.6 V (for the device 2), and 1.7 V (for the device 3). For example, the upper limit voltage within the operating voltage range is 2.1 V (for the device 1), 2.0 V (for the device 2), 1.9 V (for the device 3), and 1.9 V (for the device 4). The minimum value of the upper limit voltage is, for example, the voltage value of 1.9 V (for the device 3 and the device 4) that is minimum among 2.1 V (for the device 1), 2.0 V (for the device 2), and 1.9 V (for the device 3 and the device 4). For example, the energy saving CPU 91 causes the DC to DC converter 111 to output voltage corresponding to a voltage value (a first voltage value) when a current value of electric current being input into the DC to DC converter 111 is minimized, the voltage value being between 1.7 V (the maximum value of the lower limit voltage) and 1.9 V (the minimum value of the upper limit voltage) described above for the voltage that is output from the DC to DC converter 111.

Here, it is preferable that the storage unit 80 should store voltage value data corresponding to the voltage value (the first voltage value) described above for the voltage that is output from the DC to DC converter 111. In a case in which the storage unit 80 stores the voltage value data, when the multifunction peripheral main body 2 is set to the energy saving mode, the energy saving CPU 91 controls the DC to DC converter 111 to output the voltage of the voltage value (the first voltage value) described above, based on the voltage value data stored in the storage unit 80.

The aforementioned voltage value (the first voltage value) of the voltage that is output from the DC to DC converter 111 is obtained by the energy saving CPU 91 as follows.

The storage unit 80 stores operating voltage range data corresponding to each operating voltage range of the plurality of devices 112. An example of the operating voltage range of each of the devices 112 is shown in FIG. 4.

In a case in which the energy saving mode is set, based on the operating voltage range data stored in the storage unit 80, the energy saving CPU 91 obtains a maximum value of lower limit voltage and a minimum value of upper limit voltage of one or a plurality of devices 112 that operate in the energy saving mode. For example, in a case shown in FIG. 4, the maximum value of the lower limit voltage is 1.7 V, and the minimum value of the upper limit voltage is 1.9 V. Subsequently, the energy saving CPU 91 changes the voltage value of the voltage that is output from the DC to DC converter 111, within the range of the maximum value of the lower limit voltage to the minimum value of the upper limit voltage. For example, the energy saving CPU 91 causes the DC to DC converter 111 to output voltage, and changes the voltage value of the voltage from 1.7 V to 1.9 V.

The energy saving CPU 91 causes the current measuring unit 114 to measure a current value when the voltage value of the voltage that is output from the DC to DC converter 111 is changed. The energy saving CPU 91 obtains voltage corresponding to a voltage value when the current value measured by the current measuring unit 114 is minimized. For example, when the voltage that is output from the DC to DC converter 111 is changed from 1.7 V to 1.9 V, the energy saving CPU 91 obtains a voltage value (the first voltage value) of voltage that is output from the DC to DC converter 111 when the current value of the current that is input into the DC to DC converter 111 is minimized.

The energy saving CPU 91 causes the storage unit 80 to store the voltage value thus obtained as voltage value data. In a case in which the multifunction peripheral main body 2 is set to the energy saving mode, the energy saving CPU 91 causes the DC to DC converter 111 to output the voltage of the voltage value thus obtained, based on the voltage value data stored in the storage unit 80.

It is preferable that a plurality of energy saving modes are provided. FIG. 5 is a table showing an example of devices that operate or do not operate in energy saving modes 1 to 3. As shown in FIG. 5, for example, it is preferable that three energy saving modes are provided. In a case in which the energy saving mode 1 is set, the power shutdown unit 113 is controlled such that the electric power (voltage and current) is supplied to the device 1 (112) (ON), and the electric power (voltage and current) is not supplied to the devices 2 to 4 (112) (OFF). In a case in which the energy saving mode 2 is set, the power shutdown unit 113 is controlled such that the electric power is supplied to the devices 1 and 2 (112) (ON), and the electric power is not supplied to the devices 3 and 4 (112) (OFF). In a case in which the energy saving mode 3 is set, the power shutdown unit 113 is controlled such that the electric power is supplied to the devices 1 to 3 (112) (ON), and the electric power is not supplied to the device 4 (112) (OFF). Here, the device 1 (112) is, for example, the communication unit 100. The device 2 (112) is, for example, the engine unit 3. The device 3 (112) is, for example, the operation unit 70. The device 4 (112) is, for example, the original reading unit 20. The number of the energy saving modes is not limited to three.

In a case in which any one of the plurality of energy saving modes is set, the energy saving CPU 91 obtains a maximum value of lower limit voltage and a minimum value of upper limit voltage of one or a plurality of devices 112 that operate in the energy saving mode thus set. For example, in a case in which the energy saving mode 1 is set, the energy saving CPU 91 obtains 1.5 V as lower limit voltage and 2.1 V as upper limit voltage within the operating voltage range of the device 1 (112) (a circuit disposed in the device 1 (112)). In a case in which the energy saving mode 2 is set, the energy saving CPU 91 obtains 1.6 V as a maximum value of the lower limit voltage and 2.0 V as a minimum value of the upper limit voltage within the operating voltage range of the devices 1 and 2 (112) (circuits disposed in the devices 1 and 2 (112)). In a case in which the energy saving mode 3 is set, the energy saving CPU 91 obtains 1.7 V as a maximum value of the lower limit voltage and 1.9 V as a minimum value of the upper limit voltage within the operating voltage range of the devices 1 to 3 (112) (circuits disposed in the devices 1 to 3 (112)).

Based on the maximum value of the lower limit voltage and the minimum value of the upper limit voltage thus obtained, the energy saving CPU 91 further obtains a voltage value of voltage that is output from the DC to DC converter 111 in response to each of the plurality of the energy saving modes.

It is preferable that the storage unit 80 should further store suspension device data, in which the plurality of energy saving modes are associated with the devices 112, to which supply of voltage and current is suspended when each of the energy saving modes is set. As an example, in the suspension device data, the energy saving mode 1 is associated with the devices 2 to 4 (112), to which supply of electric power (voltage and current) is suspended when the energy saving mode 1 is set.

In a case in which the suspension device data is stored in the storage unit 80, when any one of the plurality of energy saving modes is set to the multifunction peripheral main body 2, the energy saving CPU 91 identifies the device(s) 112, to which supply of electric power (voltage and current) is suspended, based on the suspension device data stored in the storage unit 80. The energy saving CPU 91 controls the power shutdown unit 113 disposed upstream from the device(s) 112 thus identified, such that the supply of electric power (voltage and current) to the device(s) 112 thus identified is shut down. As an example, in a case in which the energy saving mode 1 is set, the energy saving CPU 91 identifies the devices 2 to 4 (112), to which supply of electric power is suspended, based on the suspension device data. The energy saving CPU 91 suspends the power supply to the devices 2 to 4 (112) by controlling the power shutdown unit 113 that is electrically connected to the upstream from each of the devices 2 to 4 (112).

Next, descriptions are provided for operations of the multifunction peripheral 1 in the present embodiment. FIG. 6 is a flowchart for illustrating an example of the operations of the multifunction peripheral 1. It should be noted that the operations described below include an operation when obtaining a voltage value of voltage that is output from the DC to DC converter 111.

In Step ST1, the multifunction peripheral main body 2 is set to an energy saving mode. As described above, in a case in which a plurality of energy saving modes are provided, the multifunction peripheral main body 2 is set to any one of the plurality of energy saving modes.

In Step ST2, the energy saving CPU 91 obtains a maximum value of lower limit voltage and a minimum value of upper limit voltage corresponding to the energy saving mode. More specifically, in a case in which any one of the plurality of energy saving modes is set, based on the operating voltage range data stored in the storage unit 80, the energy saving CPU 91 obtains a maximum value of lower limit voltage and a minimum value of upper limit voltage of one or a plurality of devices 112 that operate in the energy saving mode thus set.

In Step ST3, the energy saving CPU 91 causes the DC to DC converter 111 to output voltage, and changes the voltage value of the voltage within the range of the maximum value of the lower limit voltage to the minimum value of the upper limit voltage that are obtained in Step ST2.

In Step ST4, the energy saving CPU 91 causes the current measuring unit 114 to measure a current value of current that is output from the low-voltage power supply 110 while the voltage value is being changed in Step ST3. The energy saving CPU 91 obtains a minimum current value from a result of measurement by the current measuring unit 114.

In Step ST5, the energy saving CPU 91 obtains a voltage value of voltage that is output from the DC to DC converter 111 when the minimum current value was obtained in Step ST4.

In Step ST6, the energy saving CPU 91 causes the DC to DC converter 111 to output voltage of a voltage value that is identical to the voltage value obtained in Step ST5.

As described above, the multifunction peripheral 1 according to the present embodiment achieves effects as follows.

More specifically, in a case in which an energy saving mode is set for reducing power consumption, the multifunction peripheral main body 2 of the present embodiment causes the DC to DC converter 111 to output voltage of a voltage value corresponding to a minimum current value measured by the current measuring unit 114, the voltage being voltage of a voltage value between a maximum value of lower limit voltage and a minimum value of upper limit voltage within the operating voltage range of one or a plurality of devices 112 that operate in the energy saving mode. As a result, since the current value of the current that is input into the DC to DC converter 111 is minimized, the efficiency of the DC to DC converter 111 is improved. Thus, the multifunction peripheral 1 can reduce the power consumption.

In a case in which an energy saving mode is set, based on the operating voltage range data stored in the storage unit 80, the multifunction peripheral 1 obtains a maximum value of lower limit voltage and a minimum value of upper limit voltage of one or a plurality of devices 112 that operate in the energy saving mode. The multifunction peripheral 1 changes the voltage value of the voltage that is output from the DC to DC converter 111, within the range of the maximum value of the lower limit voltage to the minimum value of the upper limit voltage thus obtained. The multifunction peripheral 1 causes the current measuring unit 114 to measure a current value when the voltage value is changed. The multifunction peripheral 1 causes the DC to DC converter 111 to output voltage corresponding to a voltage value when the current value measured by the current measuring unit 114 is minimized. As a result, the multifunction peripheral 1 can obtain a minimum current value that is input into the DC to DC converter 111.

In a case in which any one of the plurality of energy saving modes is set, the multifunction peripheral 1 obtains a maximum value of lower limit voltage and a minimum value of upper limit voltage of one or a plurality of devices 112 that operate in the energy saving mode thus set. As a result, in a case in which any one of a plurality of energy saving modes is set, the multifunction peripheral 1 can obtain a minimum current value that is input into the DC to DC converter 111, in response to the energy saving mode thus set.

In a case in which any one of the plurality of energy saving modes is set, the multifunction peripheral 1 identifies the device(s) 112, to which supply of electric power (voltage and current) is suspended, based on the suspension device data stored in the storage unit 80. The multifunction peripheral 1 shuts down the supply of electric power (voltage and current) to the device(s) 112 thus identified. As a result, the multifunction peripheral 1 can switch over to an energy saving mode.

Furthermore, the present disclosure is not limited to the abovementioned embodiment, and can be carried out in various modes.

The multifunction peripheral 1 according to the present embodiment is a color multifunction peripheral; however, it is not limited to this configuration, and may be a monochrome multifunction peripheral.

The multifunction peripheral 1 according to the present embodiment transfers a toner image onto a paper sheet T via the intermediate transfer belt 48 (an indirect transfer configuration); however, it is not limited to this configuration, and the toner image formed by the photoreceptor drum may be directly transferred onto the paper sheet T (a direct transfer configuration).

The multifunction peripheral 1 according to the present embodiment is configured to print an image on one side of the paper sheet T; however, it is not limited to this configuration, and a image may be printed on both sides of the paper sheet T.

The image forming apparatus according to the present embodiment is not limited to the multifunction peripheral 1 described above. More specifically, the image forming apparatus of the present embodiment may be a copying machine or a printer.

Furthermore, the transfer medium, onto which the toner image is fixed by the multifunction peripheral according to the present embodiment, is not limited to a paper sheet T, and may include, for example, a plastic sheet such as an OHP (overhead projector) sheet.

What is claimed is:

1. An electronic device comprising:
   a power supply that outputs voltage and current;
   a current measuring unit that measures a current value of the current that is output from the power supply;
   a converter, into which voltage and current are input from the power supply, the converter converting the input voltage into voltage of a different voltage value, and outputting the voltage thus converted and the current;
   a plurality of devices that operate by the voltage and the current that are output from the converter; and
   a control unit that controls the converter to output voltage of a voltage value corresponding to a minimum current value measured by the current measuring unit in a case in which an energy saving mode is set for reducing power consumption, the voltage being voltage of a voltage value between a maximum value of lower limit voltage and a minimum value of upper limit voltage within an operating voltage range of a plurality of devices that operate in the energy saving mode.

2. The electronic device according to claim 1, further comprising:
   a storage unit that stores operating voltage range data corresponding to each operating voltage range of the plurality of devices,
   wherein, in a case in which the energy saving mode is set, the control unit obtains a maximum value of lower limit voltage and a minimum value of upper limit voltage of a plurality of devices that operate in the energy saving mode, based on the operating voltage range data stored in the storage unit; the control unit changes a voltage value of voltage that is output from the converter, within a range of the maximum value of the lower limit voltage to the minimum value of the upper limit voltage; the control unit causes the current measuring unit to measure a current value when the voltage value is changed; and the control unit causes the converter to output voltage corresponding to a voltage value when the current value measured by the current measuring unit is minimized.

3. The electronic device according to claim 2,
   wherein a plurality of energy saving modes are provided, and
   wherein, in a case in which any one of the plurality of energy saving modes is set, the control unit obtains a maximum value of lower limit voltage and a minimum value of upper limit voltage of a plurality of devices that operate in the energy saving mode thus set.

4. The electronic device according to claim 3, further comprising:
   a voltage-current shutdown unit that is disposed upstream from each of the plurality of devices,
   wherein the storage unit further stores suspension device data, in which the plurality of energy saving modes are associated with the devices, to which supply of voltage and current is suspended when the respective energy saving mode is set, and
   wherein, in a case in which any one of the plurality of energy saving modes is set, the control unit identifies a device, to which supply of voltage and current is suspended, based on the suspension device data stored in the storage unit; and the control unit controls the voltage-current shutdown unit disposed upstream from the device thus identified, such that the supply of voltage and current to the device thus identified is shut down.

\* \* \* \* \*